United States Patent
Chen et al.

(10) Patent No.: US 7,821,982 B2
(45) Date of Patent: Oct. 26, 2010

(54) PACKET COMMUNICATIONS TAKING INTO ACCOUNT CHANNEL QUALITY AND BUFFERED DATA AMOUNT

(75) Inventors: Lan Chen, Yokohama (JP); Hidetoshi Kayama, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1129 days.

(21) Appl. No.: 10/736,698

(22) Filed: Dec. 17, 2003

(65) Prior Publication Data

US 2004/0184417 A1  Sep. 23, 2004

(30) Foreign Application Priority Data

Dec. 17, 2002  (JP)  ............................. 2002-365563

(51) Int. Cl.
*H04Q 7/00*  (2006.01)
(52) U.S. Cl. .................................. 370/328; 455/452.2
(58) Field of Classification Search .................. 370/328
See application file for complete search history.

(56) References Cited

U.S. PATENT DOCUMENTS

| | | | |
|---|---|---|---|
| 6,167,031 A | | 12/2000 | Olofsson et al. |
| 6,330,288 B1 | | 12/2001 | Budka et al. |
| 6,701,129 B1 | * | 3/2004 | Hashem et al. ........... 455/67.11 |
| 6,721,302 B1 | * | 4/2004 | Alastalo ...................... 370/346 |
| 2003/0148780 A1 | * | 8/2003 | Takano ........................ 455/522 |
| 2004/0187069 A1 | * | 9/2004 | Pietraski et al. ............. 714/786 |
| 2006/0205358 A1 | * | 9/2006 | Itoh et al. ..................... 455/69 |

FOREIGN PATENT DOCUMENTS

| | | | |
|---|---|---|---|
| EP | 1 249 951 A1 | | 10/2002 |
| EP | 1381180 A1 | * | 1/2004 |
| JP | 9-312649 | | 12/1997 |
| JP | 2000-224665 | | 8/2000 |
| JP | 2000-316035 | | 11/2000 |
| JP | 2002-112321 | | 4/2002 |
| WO | WO 00/41318 | | 7/2000 |
| WO | WO 02/41647 A2 | | 5/2002 |

OTHER PUBLICATIONS

3GPP TR 25.848 V4.0.0 (2001-2003) Technical Report, pp. 1-89, $3_{rd}$ Generation Partnership Project; Technical Specification Group Radio Access Network; Physical Layer Aspects of Utra High Speed Downlink Packet Access (Release 4), Mar. 2001.

* cited by examiner

*Primary Examiner*—Nick Corsaro
*Assistant Examiner*—German Viana Di Prisco
(74) *Attorney, Agent, or Firm*—Oblon, Spivak, McClelland, Maier & Neustadt, L.L.P.

(57) ABSTRACT

A base station includes a channel quality detecting unit that detects channel quality between the base station and a mobile station, a buffered data amount monitoring unit, and a modulation and coding set determination unit. The modulation and coding set determination unit determines a modulation and coding set, as a downlink modulation scheme for packet communications, such that a prescribed communication condition corresponding to the channel quality is satisfied, and that padding added to the data buffered in a transmission buffer for subsequent transmission to the mobile station becomes the minimum.

7 Claims, 8 Drawing Sheets

FIG.2

| CQI | REQUIRED SINR (dB) | MODULATION AND CODING SET | TOTAL TRANSMISSION RATE (Mbps) | TBS/slot (kbit) |
|---|---|---|---|---|
| 1 | 2.0 | QPSK1/2 | 22 | 11 |
| 2 | 5 | QPSK3/4 | 34 | 17 |
| 3 | 6.5 | 16QAM1/2 | 45 | 22.5 |
| 4 | 10.5 | 16QAM3/4 | 68 | 34 |
| 5 | 13 | 64QAM3/4 | 102 | 51 |

FIG.7A

| MOBILE STATION | BUFFERED DATA AMOUNT | MODULATION AND CODING SET (MCS) | TRANSMISSION BLOCK SIZE (TBS) | PADDING | REQUIRED SINR (dB) |
|---|---|---|---|---|---|
| #1 | 15 kbits | 64QAM3/4 | 51 kbits | 51−15=36 kbits | 13 |
| #2 | 20 kbits | 64QAM3/4 | 51 kbits | 51−25=26 kbits | 13 |
| #3 | 20 kbits | QPSK1/2 | 11 kbits | 0 | 2 |

FIG.7B

| MOBILE STATION | BUFFERED DATA AMOUNT | MODULATION AND CODING SET (MCS) | TRANSMISSION BLOCK SIZE (TBS) | PADDING | REQUIRED SINR (dB) |
|---|---|---|---|---|---|
| #1 | 15 kbits | QPSK3/4 | 17 kbits | 17−15=2 kbits | 5 |
| #2 | 25 kbits | 16QAM3/4 | 34 kbits | 34−25=9 kbits | 10.5 |
| #3 | 20 kbits | QPSK1/2 | 11 kbits | 0 | 2 |

PACKET COMMUNICATIONS TAKING INTO ACCOUNT CHANNEL QUALITY AND BUFFERED DATA AMOUNT

BACKGROUND OF THE INVENTION

The present invention generally relates to packet communications between a base station and a mobile terminal, and more particularly, to packet communications using a modulation and coding set determined based on the channel quality and the amount of data buffered at the sender.

The $3^{rd}$ Generation Partnership Project (3GPP) of the International Mobile Telecommunication 2000 (IMT-2000) has standardized the specification of High Speed Downlink Packet Access (HSDPA), which is a packet-based data service for W-CDMA (Wideband Code Division Multiple Access) downlink. See $3^{rd}$ Generation Partnership Project, "Technical Specification Group Radio Access Network; Physical Layer Aspects of UTRA Hight Speed Downlink Packet Access (Release 2000), 3G TR. 25.848, VO. 2.0 (2000-05), which was also accessed over the Internet at URL http://www.3gpp.org on Dec. 12, 2002.

In HSDPA, link adaptation is employed to select a modulation scheme in accordance with the channel quality. To be precise, a high-rate modulation and coding set is used for a mobile station with good channel quality, and the transmission block size (TBS) per unit time is set large. On the other hand, for a mobile station with bad channel quality, a low-rate modulation and coding set is used, and the TBS is set small.

There are various types of traffic patterns arising at a mobile station, and therefore, the amount of data buffered in the transmission buffer of the mobile station for the subsequent transmission is variable. To this end, when the amount of data delayed in the buffer from being transmitted is smaller than the TBS, the mobile station adds padding to the data to be transmitted from the buffer when creating a packet. The padding corresponds to the difference between the TBS and the amount of data to be transmitted from the buffer.

However, since padding does not bear information, it is desired, from the standpoint of efficient use of the radio resources, that the padding field be as small as possible. Meanwhile, since a high-rate modulation and coding scheme is inferior, in protection against noise interference, to a low-rate modulation and coding scheme, data are less likely to be received successfully on the receiving side when a high-rate modulation and coding set is used. For this reason, it is desirable to employ a low-rate modulation and coding set in the case where the amount of data, except for padding, to be transmitted is the same as can be transmitted in a transmission time interval (e.g., a time slot).

An example is given wherein there is a mobile station existing that has good channel quality and holds a small amount of data to be transmitted in the buffer. In this case, the mobile station generally employs a high-rate modulation and coding set because of the good channel quality. However, because the transmission block size (TBS) becomes large when using a high-rate modulation and coding set, a large amount of padding has to be added to the small amount of data to be transmitted, and consequently, the radio resources are wasted. In addition, QoS (Quality of Service) is degraded due to the increased probability of failing at data receiving.

SUMMARY OF THE INVENTION

Therefore, it is an object of the present invention to overcome the above-described problems in the conventional art, and to provide a packet communications technique that can reduce the amount of padding added to the data to be transmitted, while improving QoS and protection against interference.

To achieve the object, in one aspect of the invention, a packet communications method carried out between a base station and a mobile station controlled by the base station is provided. The method comprises the steps of detecting channel quality between the base station and the mobile station, detecting the amount of data buffered in a transmission buffer of a sender, and determining a modulation scheme to be used in the packet transmission based on the channel quality and the amount of data buffered in the transmission buffer.

With this method, the modulation scheme is determined taking into account not only the channel quality between the base station and the mobile station, but also the amount of data from the delayed portion of the buffer of the sender. When the channel quality between the base station and the mobile station is good, and when the amount of data buffered in the transmission buffer is small, then a modulation scheme that implements a low transmission rate is employed. Consequently, the amount of padding added to the data to be transmitted can be reduced, while improving QoS and protection against noise interference.

In determination of the modulation scheme, a modulation scheme is selected such that a prescribed transmission condition is satisfied and that padding, which is added to data to be transmitted when the amount of data buffered in the transmission buffer is less than a transmission unit size, becomes the minimum, based on the channel quality and the data amount in the buffer.

In another aspect of the invention, a base station that carries out packet transmission to a mobile station located in its control area is provided. The base station comprises a channel quality detecting unit that detects the channel quality between the base station and the mobile station, a buffered data amount monitoring unit that monitors the amount of data buffered in the transmission buffer of the base station, and a modulation scheme determination unit that determines a modulation scheme based on the channel quality and the amount of data buffered in the transmission buffer.

The modulation scheme determination unit selects a modulation scheme that satisfies a prescribed transmission condition and that makes padding, which is added to the data to be transmitted when the amount of data buffered in the transmission buffer is less than a transmission unit size, become the minimum, based on the channel quality and the data amount in the buffer.

In still another aspect of the invention, a mobile station that carries out packet communication with a base station is provided. The mobile station comprises a channel quality detecting unit that detects the channel quality between the base station and the mobile station, a buffered data amount monitoring unit that monitors the amount of data buffered in the transmission buffer of the mobile station, and a modulation scheme determination unit that determines a modulation scheme based on the channel quality and the amount of data buffered in the transmission buffer.

The modulation scheme determination unit of the mobile station selects a modulation scheme that satisfies a prescribed transmission condition and that makes padding, which is added to the data to be transmitted when the amount of data buffered in the transmission buffer is less than a transmission unit size, become the minimum, based on the channel quality and the data amount in the buffer.

BRIEF DESCRIPTION OF THE DRAWINGS

Other objects, features, and advantages of the invention will become more apparent from the following detailed description when read in conjunction with the accompanying drawings, in which

FIG. 2 is a table showing examples of modulation and coding set in association with channel qualities according to the invention;

FIG. 7 illustrates with tables the padding reducing effect achieved by the present invention by selecting an appropriate modulation and coding set (FIG. 7B), as compared with the conventional technique (FIG. 7A)

DETAILED DESCRIPTION OF THE INVENTION

The present invention will now be described in detail below in conjunction with the attached drawings, based on the first embodiment in which packets are transmitted from a base station to a mobile station, and the second embodiment in which packets are transmitted from a mobile station to a base station.

Figure 1:
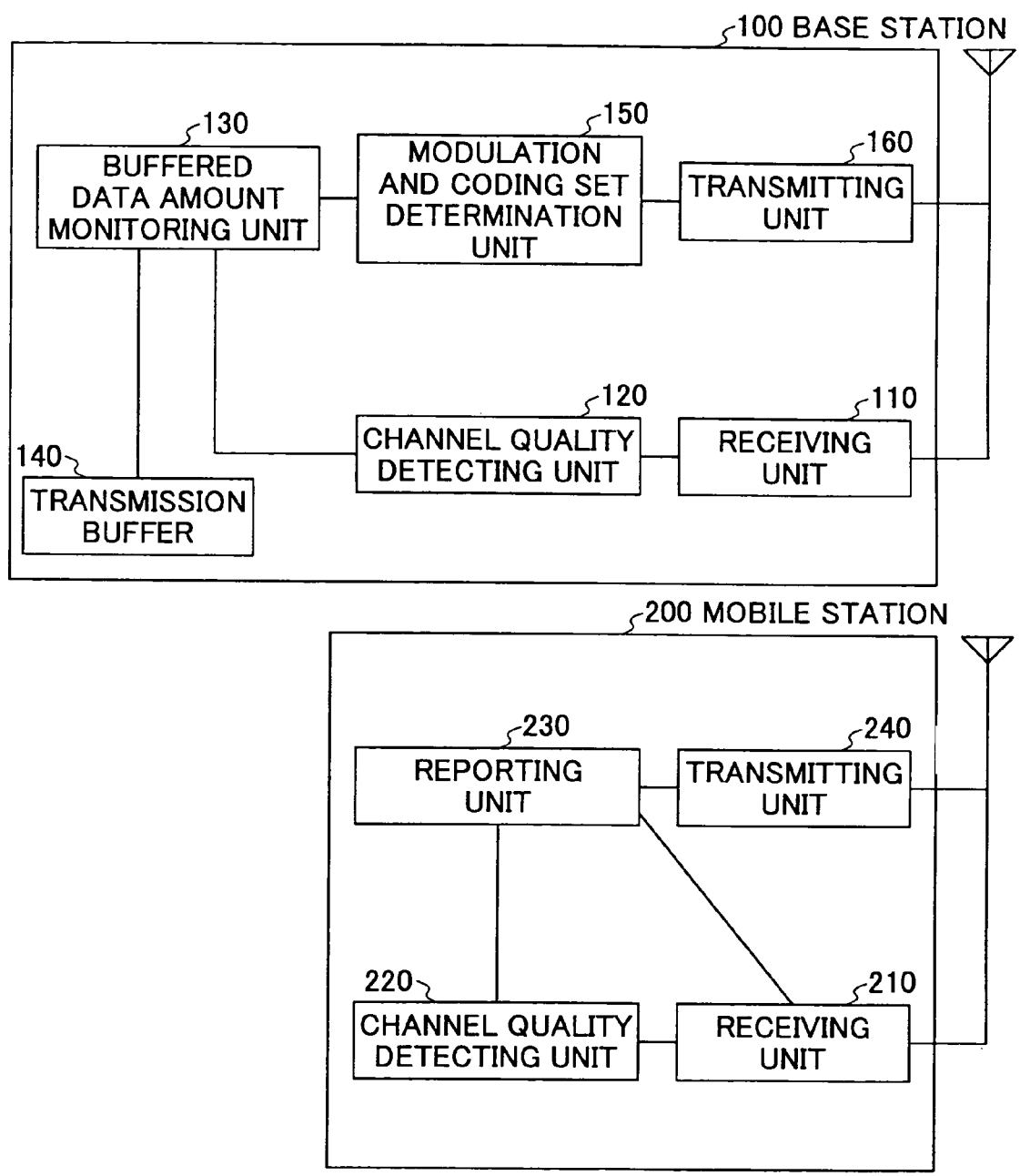
FIG. 1 is a block diagram illustrating the structures of a base station and a mobile station according to the first embodiment of the invention.

FIG. 1 illustrates the structures of a base station and a mobile station according to the first embodiment of the invention. In packet transmission from the base station 100 to the mobile station 200, a modulation and coding set is determined such that a prescribed transmission condition is satisfied, and that padding, which is added to the data to be transmitted when the amount of data buffered in the transmission buffer of the base station is less than a transmission block size (TBS), becomes the minimum.

Base station 100 includes a receiving unit 110, a channel quality detecting unit 120, a buffered data amount monitoring unit 130, a transmission buffer 140, a modulation and coding set determination unit 150, and a transmitting unit 160. Mobile station 200 includes a receiving unit 210, a channel quality detecting unit 220, a reporting unit 230, and a transmitting unit 240.

The transmitting unit 160 of the base station 100 transmits a broadcast message containing identification information of the base station to mobile stations located in the cell managed by the base station 100.

The mobile station 200 receives the broadcast message at the receiving unit 210, and supplies the message to the channel quality detecting unit 220. Then, the channel quality detecting unit 220 detects the downlink channel quality, based on the broadcast message. The channel quality is represented by a channel quality indicator (CQI). In this embodiment, the value of CQI increases as the channel quality becomes more satisfactory. However, CQI may be arranged such that the CQI value decreases as the channel quality becomes more satisfactory. The channel quality detecting unit 220 supplies the detected CQI to the reporting unit 230. The reporting unit 230 transmits the CQI to the base station 100 via the transmitting unit 240 to report the receiving result and the downlink channel quality.

The receiving unit 110 of the base station 100 receives the CQI from the mobile station 200, and passes the received CQI, together with the ID information (e.g., telephone number) of the mobile station 100 that has transmitted the CQI, to the channel quality detecting unit 120. The channel quality detecting unit 120 thereby detects the channel quality of the downlink from the base station 100 to the mobile station 200. The channel quality detecting unit 120 supplies the CQI and the ID information of the mobile station 200 to the buffered data amount monitoring unit 130.

Upon receiving the CQI and the mobile station ID information from the channel quality detecting unit 120, the data amount monitoring unit 130 specifies the mobile station 200 from the ID information. Then, the buffered data amount monitoring unit 130 detects the amount of data buffered in the transmission buffer 140 for subsequent transmission to this mobile station 200. The determined amount of data from the delayed portion of the transmission buffer 140 and the CQI are supplied to the modulation and coding set determination unit 150.

Based on the CQI and the amount of data to be transmitted to the mobile station 200, the modulation and coding set determination unit 150 determines a modulation and coding set that satisfies a prescribed transmission condition and that makes padding, which is added to the data to be transmitted when the buffered data amount is less than the transmission unit size, become the minimum.

To be more precise, the modulation and coding set determination unit 150 has a table (which is referred to as a "modulation and coding set table") shown in FIG. 2 from which to select the optimum modulation and coding set. The table records multiple levels of CQI, each of which is associated with the SINR required to allow the packets to be successfully received at the receiving side, the modulation and coding set that satisfies the required SINR, the total transmission rate for use with this modulation and coding set, and the transmission block size per slot (TBS/slot). In the examples shown in FIG. 2, the radio resources employ the frame structure with 10 slots per frame, and the slot occupation time is 0.5 ms.

The modulation and coding set determination unit 150 selects the mobile station 200 according to the scheduling. Then, the modulation and coding set determination unit 150 selects the appropriate SINR required under this CQI level to prevent a receiving error from occurring at the receiving side, and determines the corresponding modulation and coding set that satisfies the required SINR from the table. The determined modulation and coding set is a temporary modulation and coding set (MCS). The modulation and coding set determination unit 150 also determines the transmission block size per slot (TBS/slot), as a temporary TBS, corresponding to the temporary MCS from the table.

Then, the modulation and coding set determination unit 150 compares the amount of data held in the buffer for the subsequent transmission to the mobile station 200 (referred to as "buffered data amount") with the temporary TBS. If the buffered data amount is greater than or equal to the temporary TBS, then the modulation and coding set determination unit 150 sets the temporary MCS to the actual MCS.

On the other hand, when the buffered data amount is less than the temporary TBS, then the modulation and coding set determination unit 150 selects a TBS/slot from the modulation and coding set table that is at or above the buffered data amount and has a minimum gap from the buffered data amount. Then, the modulation and coding determination unit 150 selects the modulation and coding set that corresponds to the selected TBS/slot, as the actual modulation and coding set (MCS). Since the gap between the buffered data amount and the TBS/slot corresponding to the actual modulation and coding set is the minimum, this TBS/slot is less than or equal to the temporary TBS/slot that corresponds to the temporary MCS. This means that the rate of the actual modulation and coding set is less than or equal to the temporary MCS.

Then, the modulation and coding set determination unit 150 supplies the actual modulation and coding set and the mobile station ID information received from the buffered data amount monitoring unit 130, to the transmitting unit 160. The transmitting unit 160 transmits the actual modulation and coding set to the mobile station 200 specified by the mobile station ID information.

The receiving unit 210 of the mobile station 200 receives the modulation and coding set from the base station 100, and supplies this MCS to the reporting unit 230. Upon receiving the modulation and coding set from the receiving unit 210, the reporting unit 230 returns a response representing the receipt of the modulation and coding set (referred to as a "receipt response") to the base station 100 through the transmitting unit 240.

Upon receiving the receipt response, the receiving unit 110 of the base station 100 supplies this response, together with the ID information of the mobile station 200 that has transmitted the receipt response, to the buffered data amount monitoring unit 130, via the channel quality detecting unit 120.

Upon receiving the receipt response and the mobile station ID information, the buffered data amount monitoring unit 130 specifies the mobile station 200. The buffered data amount monitoring unit 130 reads the data to be transmitted to the specified mobile station 200 from the transmission buffer 140. The data read from the buffer 140 and the mobile station ID information are supplied to the modulation and coding set determination unit 150.

The modulation and coding set determination unit 150 produces a packet containing the data to be transmitted to the mobile station 200. To be more precise, the modulation and coding set determination unit 150 selects the TBS/slot corresponding to the determined modulation and coding set from the modulation and coding set table (FIG. 2), and adds padding to the data to be transmitted to the mobile station 200 to form a packet of one slot. The amount of padding equals the difference between the selected TBS/slot and the data to be transmitted. Then, the modulation and coding set unit 150 supplies the packet, together with the employed modulation and coding set and the mobile station ID information supplied from the buffered data amount monitoring unit 130, to the transmitting unit 160.

The transmitting unit 160 transmits the packet to the mobile station 200 specified by the mobile station ID information, using the modulation and coding set determined by the modulation and coding set determination unit 150.

Figure 3:
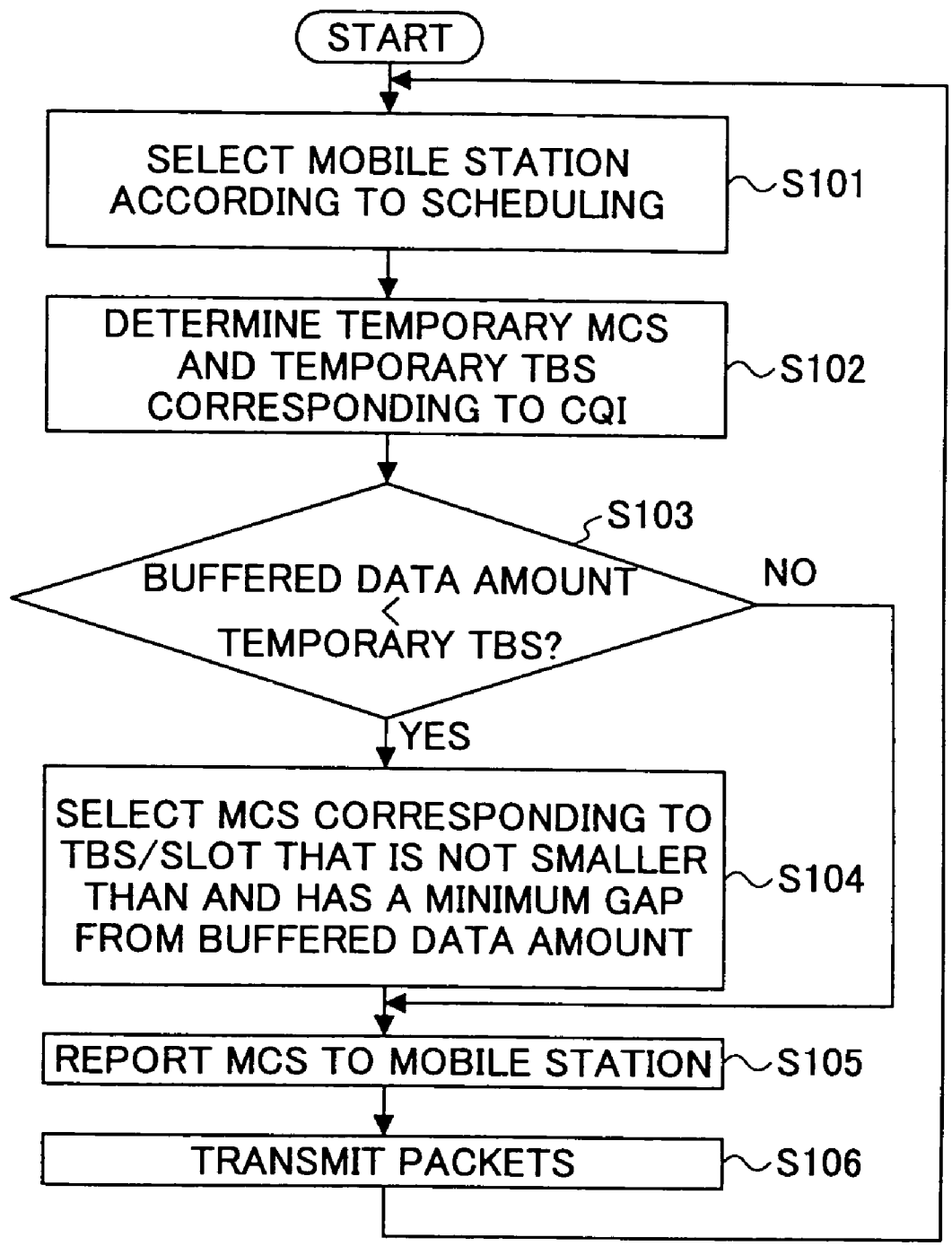
FIG. 3 is a flowchart showing the operations carried out by the base station in the first embodiment.

FIG. 3 is a flowchart showing the operation of the base station 100 according to the first embodiment of the invention.

The base station 100 selects a mobile station 200 according to the scheduling (step 101). Then, the base station 100 determines a temporary MCS and a temporary TBS that correspond to the CQI transmitted from the mobile station 200, from the modulation and coding set table (S102).

Then, the base station 100 determines whether the buffered data amount is less than the temporary TBS (S103) If the buffered data amount is greater than or equal to the temporary TBS (NO in S103), the base station 100 reports this temporary MCS as the actual modulation and coding set to the mobile station 100 (S105). Then, having received a response indicating the receipt of the modulation and coding set (MCS) from the mobile station 200, the base station 100 transmits packets to the mobile station 200 using the determined MCS (S106).

On the other hand, if the buffered data amount is less than the temporary TBS (YES in S103), the base station 100 selects an MCS corresponding to the TBS/slot that is greater than or equal to the buffered data amount and that has a minimum gap from the buffered data amount, based on the modulation and coding set table (S104). The base station 100 reports the selected MCS, as the actual modulation and coding set, to the mobile station 100 (S105). Then, having received a response indicating the receipt of the selected MCS from the mobile station 200, the base station 100 transmits packets to the mobile station 200, using the selected MCS (S106).

After the packets have been transmitted in step S106, the base station 100 repeats steps S101 through S106.

Figure 4:
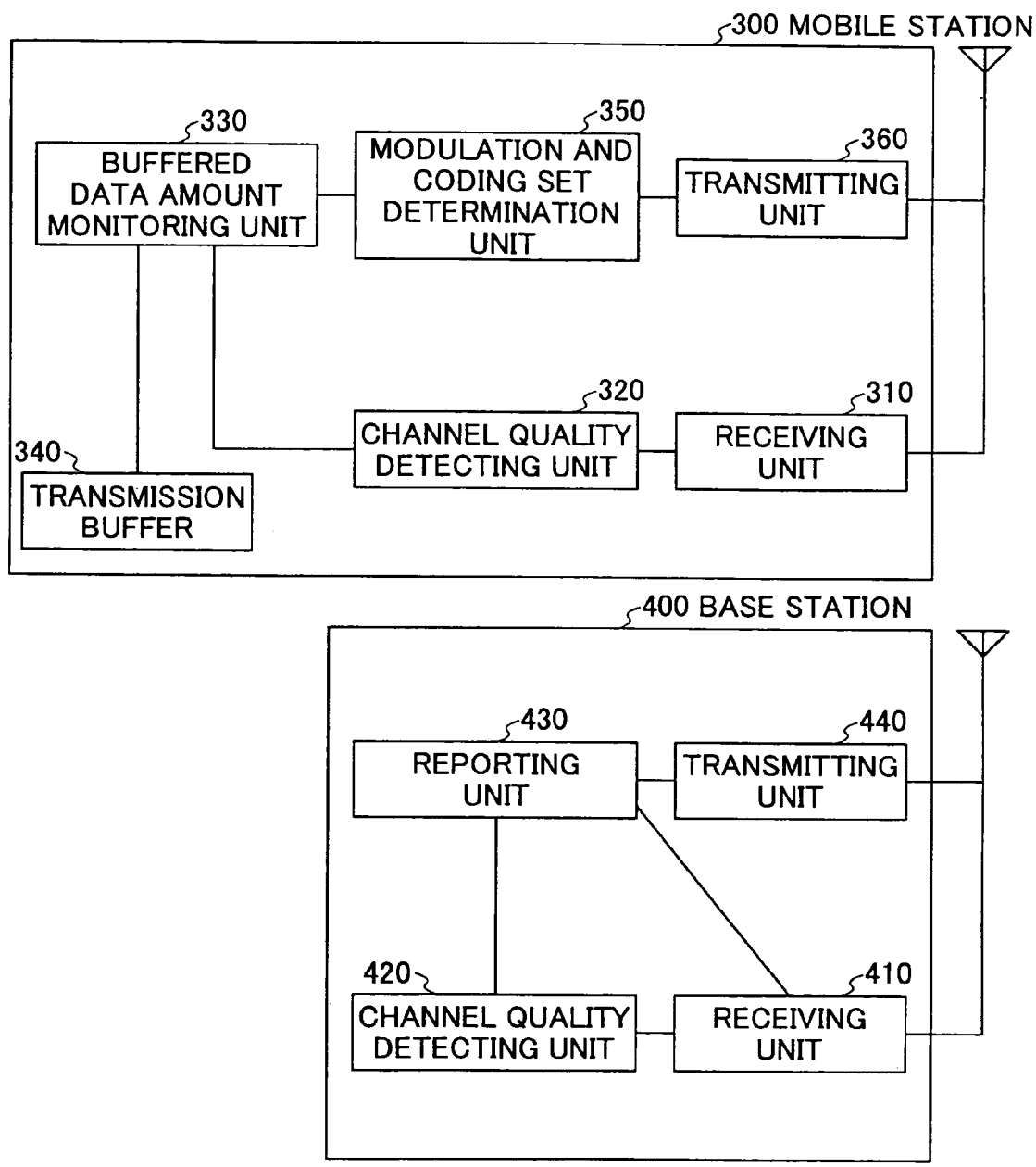
FIG. 4 is a block diagram illustrating the structures of a base station and a mobile station according to the second embodiment of the invention.

FIG. 4 illustrates the structures of a base station 400 and a mobile station 300 according to the second embodiment of the invention. In the second embodiment, when packets are transmitted from the mobile station 300 to the base station 400, a modulation and coding set is determined such that a prescribed QoS is satisfied and that the padding added to the data buffered in the transmission buffer of the mobile station 300 becomes the minimum.

Similar to the base station 100 of the first embodiment, the mobile station 300 includes a receiving unit 310, a channel quality detecting unit 320, a buffered data amount monitoring unit 330, a transmission buffer 340, a modulation and coding set determination unit 350, and a transmitting unit 360. On the other hand, similar to the mobile station 200 of the first embodiment, base station 400 includes a receiving unit 410, a channel quality detecting unit 420, a reporting unit 430, and a transmitting unit 440.

The transmitting unit 360 of the mobile station 300 transmits a resource allocation request or a transmission permission request to the base station 400, prior to transmitting the packets. The base station 400 receives the resource allocation request or the transmission permission request at the receiving unit 410, and supplies the request to the channel quality detecting unit 420. Based on the resource allocation request or the transmission permission request, the channel quality detecting unit 400 detects the uplink channel quality (that is, uplink CQI in this embodiment) from the mobile station 300 to the base station 400. The channel quality detecting unit 420 supplies the detected CQI to the reporting unit 430. The reporting unit 430 supplies the CQI to the transmitting unit 440, which then transmits this CQI to the mobile station 300. The transmitting unit 440 also transmits the response to the resource allocation request or the transmission permission request, to the mobile station 300.

The mobile station 300 receives the CQI from the base station 400 at the receiving unit 310, and passes the CQI to the channel quality detecting unit 320. The receiving unit 310 also passes the response to the resource allocation request or the transmission permission request, which has been transmitted from the base station 400, to the modulation and coding set determination unit 350, via the channel quality detecting unit 320 and the buffered data amount monitoring unit 330.

Based on the CQI supplied from the receiving unit 310, the channel quality detecting unit 320 detects the channel quality of the uplink from the mobile station 300 to the base station 400. The channel quality detecting unit 320 supplies the CQI to the buffered data amount monitoring unit 330.

The buffered data amount monitoring unit 330 monitors the amount of data buffered in transmission buffer 340 for the subsequent transmission to the base station 400. Upon receiving the CQI from the channel quality detecting unit 320, the buffered data amount monitoring unit 330 supplies this CQI, together with the amount of data addressed to the base station 400, to the modulation and coding set determination unit 350.

The modulation and coding set determination unit 350 has a modulation and coding set table shown in FIG. 2. When the response to the resource allocation request or the transmission permission request, which has been transmitted from the base station 400, is a positive response (that is, indicating that the resources are available or transmission is permissible), then the modulation and coding set determination unit 350 selects a modulation and coding set that satisfies a prescribed QoS (in this case, the signal to interference noise ratio SINR) corresponding to the CQI, and that makes the padding, which is added to the buffered data in the transmission buffer 340 for the subsequent transmission to the base station 400, become the minimum, based on the modulation and coding set table, and the CQI and the buffered data amount supplied from the buffered data amount monitoring unit 330.

The modulation and coding set determination unit 350 of the mobile station 300 performs the same operation as the modulation and coding set determination unit 150 of the base station 100 of the first embodiment. Namely, the modulation and coding set determination unit 350 selects the appropriate SINR required for the CQI supplied from the buffered data amount monitoring unit 330, based on the modulation and coding table, and then, selects the modulation and coding set, as a temporary MCS, that satisfies the selected SINR. The modulation and coding set determination unit 350 also selects the TBS/slot associated with this temporary MCS as a temporary TBS, based on the modulation and coding set table.

The modulation and coding set determination unit 350 compares the amount of data to be transmitted to the base station 400 (referred to as the "buffered data amount"), which is supplied from the buffered data amount monitoring unit 330, with the temporary TBS. If the buffered data amount is greater than or equal to the temporary TBS, the modulation and coding set determination unit 350 selects the temporary MCS as the actual modulation and coding set (MCS), and transmits this MCS to the base station 400 via the transmitting unit 360.

On the other hand, if the buffered data amount is less than the temporary TBS, then the modulation and coding set determination unit 350 selects a TBS/slot from the modulation and coding set table, that is at or above the buffered data amount and has a minimum gap from the buffered data amount. Then, the modulation and coding determination unit 150 selects the modulation and coding set that is associated with the selected TBS/slot, as the actual modulation and coding set (MCS).

The receiving unit 410 of the base station 400 receives the modulation and coding set from the mobile station 300, and supplies this MCS to the reporting unit 430. The reporting unit 430 transmits a response indicating the receipt of the modulation and coding set (referred to as a "receipt response") to the mobile station 300 through the transmitting unit 440.

Upon receiving the receipt response, the receiving unit 310 of the mobile station 300 supplies the response to the buffered data amount monitoring unit 330, via the channel quality detecting unit 320.

Upon receiving the receipt response, the buffered data amount monitoring unit 330 reads the data addressed to the base station from the transmission buffer 340, and supplies the data to the modulation and coding set determination unit 350.

The modulation and coding set determination unit 350 produces a packet containing the data to be transmitted to the base station 400. The modulation and coding set determination unit 350 performs the same operation as the modulation and coding set determination unit 150 of the base station 100 of the first embodiment. Namely, the modulation and coding set determination unit 350 selects the TBS/slot corresponding to the determined modulation and coding set, based on the modulation and coding set table, and adds padding to the data to be transmitted to the base station 400 to form a packet of one slot. The amount of padding equals the difference between the selected TBS/slot and the data to be transmitted. Then, the modulation and coding set unit 350 supplies the packet, together with the employed modulation and coding set, to the transmitting unit 360.

The transmitting unit 360 transmits the packet to the base station 400, using the modulation and coding set determined by the modulation and coding set determination unit 350.

Figure 5:
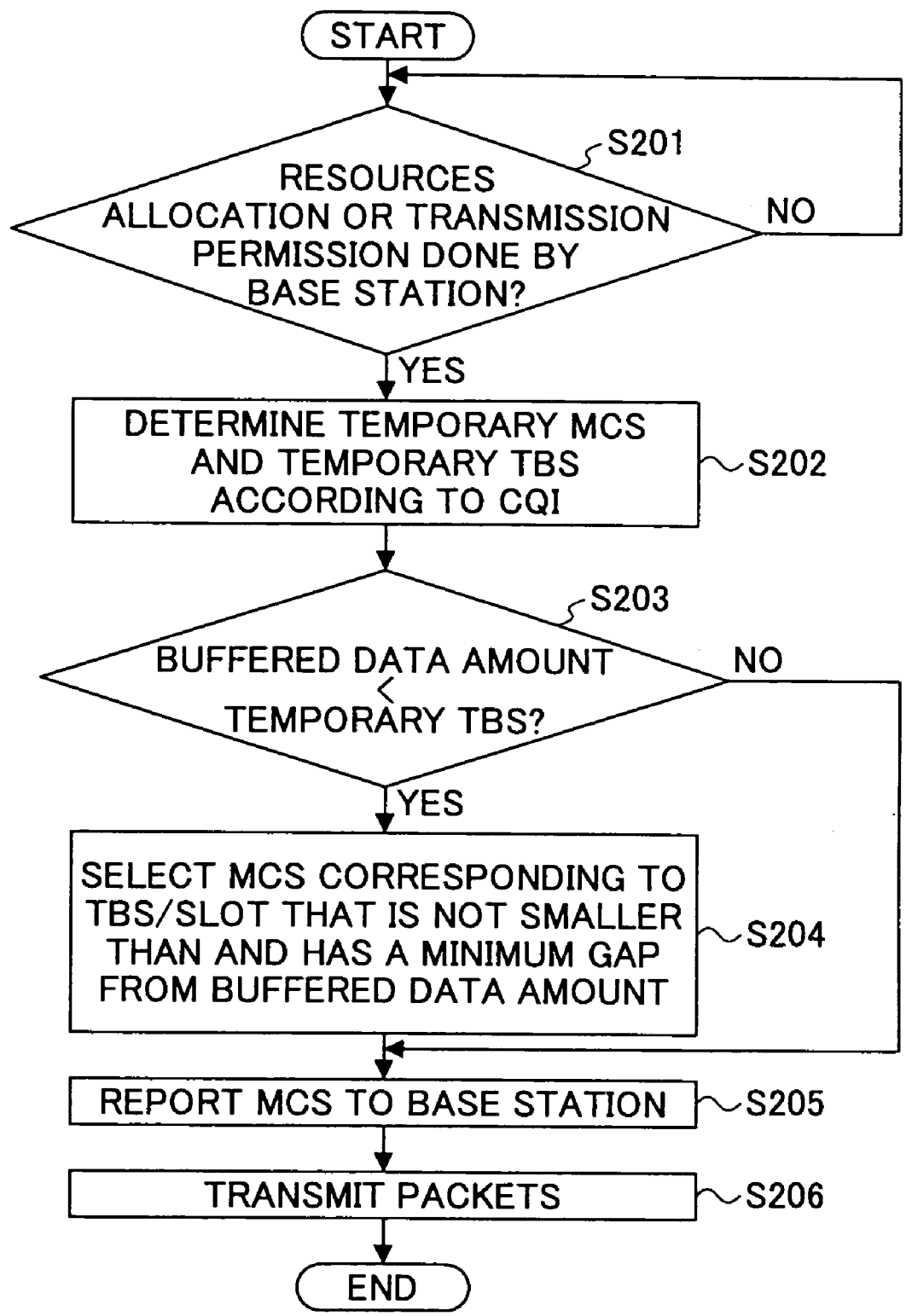
FIG. 5 is a flowchart showing the operations carried out by the mobile station according to the second embodiment of the invention.

FIG. 5 is a flowchart showing the operations of the mobile station 300 according to the second embodiment of the invention.

The mobile station 300 determines whether the base station 400 has allocated resources or has given transmission permission to the mobile station 300 (step 201).

If resource allocation or transmission permission has been conducted by the base station, the mobile station 300 determines a temporary MCS and a temporary TBS that correspond to the CQI transmitted from the base station 400, based on the modulation and coding set table (S202).

Then, the mobile station 300 determines whether the buffered data amount is less than the temporary TBS (S203). If the buffered data amount is greater than or equal to the temporary TBS (NO in S203), the mobile station 300 reports the temporary MCS as the actual modulation and coding set to the base station 400 (S205). Then, having received a response indicating the receipt of the modulation and coding set (MCS) from the base station 400, the mobile station 300 transmits packets to the base station 400 using the determined MCS (S206).

On the other hand, if the buffered data amount is less than the temporary TBS (YES in S203), the mobile station 300 selects an MCS corresponding to the TBS/slot that is greater than or equal to the buffered data amount and that has a minimum gap from the buffered data amount, based on the modulation and coding set table (S204). The mobile station 300 reports the selected MCS, as the actual modulation and coding set, to the base station 400 (S205). Then, having received a response indicating the receipt of the selected MCS from the base station 400, the mobile station 300 transmits packets to the base station 400, using the selected MCS (S206).

After the packets have been transmitted in step S206, the mobile station 300 repeats steps S201 through S206.

Figure 6:
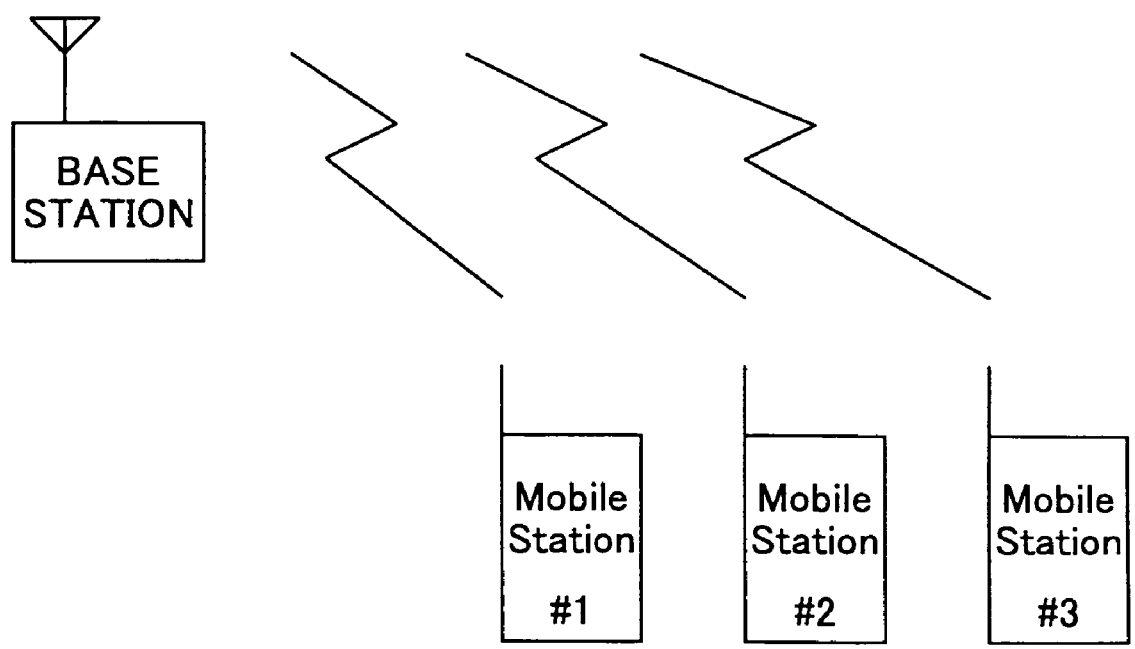
FIG. 6 is a schematic diagram illustrating an example of a mobile communications system.

Next, determination of the modulation and coding set according to the present invention is explained, as compared with the conventional technique. It is assumed that there are a base station, which is a sender of a packet, and three mobile stations #1, #2, and #3, which are on the receiving side under the control of the base station, as illustrated in FIG. 6. It is also assumed that the modulation and coding table of FIG. 2 is used. The CQI at the mobile station #1 is 5, and its buffered data amount is 15 kbits. The CQI of the mobile station #2 is 5, and its buffered data amount is 25 kbits. The CQI of the mobile station #3 is 1, and its buffered data amount is 20 kbits.

The conventional method determines a modulation and coding set based only on the channel quality (CQI in this example). Accordingly, as illustrated in FIG. 7A, the modulation and coding set of 64QAM3/4 and the transmission block size (TBS) of 51 kbits are selected for mobile station #1, correspond to CQI level 5. Similarly, 64QAM3/4 and 51 kbits TBS are selected for mobile station #2, corresponding to CQI level 5. For mobile station #3, QPSK1/2 and 11 kbits TBS are selected corresponding to CQI level 1.

Figure 8A:
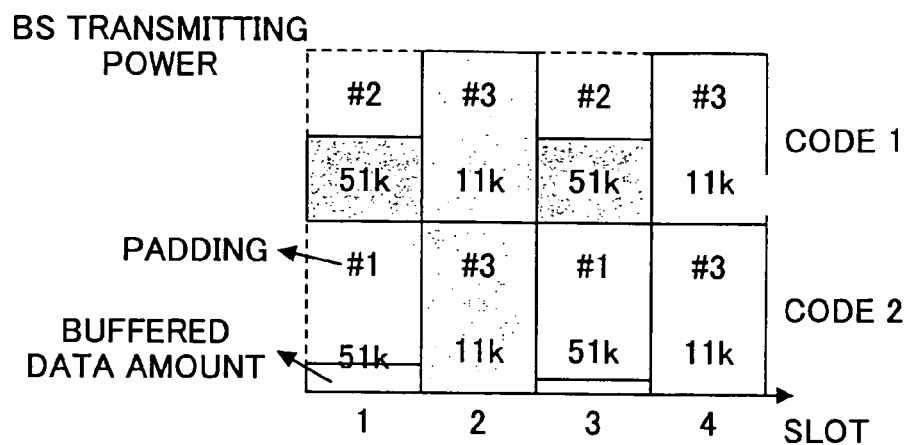
FIG. 8 illustrates with schematic diagrams the transmitting power reducing effect achieved by the present invention, as compared with the conventional technique.

Since padding is required equaling the difference between the TBS and the buffered data amount, mobile station #1 requires padding of 36 kbits, which equals 51 kbits minus 15 kbits (51−15=36). Thus, mobile station #1 requires a large amount of padding. Mobile station #2 requires padding of 26 kbits, which equals 51 kbits minus 25 kbits (51−25=26). This means that a large portion of transmitting power of the base station (BS) is wasted for padding, which does not bear effective information, when transmitting packets to mobile stations #1 and #2, as illustrated in FIG. 8A.

In contrast, the sender (for example, the base station) determines the modulation and coding set based not only on the channel quality (CQI), but also on the amount of data buffered in the transmission buffer, according to the present invention. Consequently, a lower-rate modulation and coding set is selected for mobile station #1, in place of 64QAM3/4 corresponding to CQI level 5. To be more precise, a modulation and coding set of QPAK3/4 is selected, corresponding to the transmission block size (TBS) of 17 kbits, which is greater than the buffered data amount (15 kbits) and has the minimum gap from the buffered data amount. For mobile station #2, a lower-rate modulation and coding set is selected, in place of 64QAM3/4 corresponding to CQI level 5. To be more precise, a modulation and coding set of 16QAM3/4 is selected, corresponding to the transmission block size (TBS) of 34 kbits, which is greater than the buffered data amount (25 kbits) and has the minimum gap from the buffered data amount.

Figure 8B:
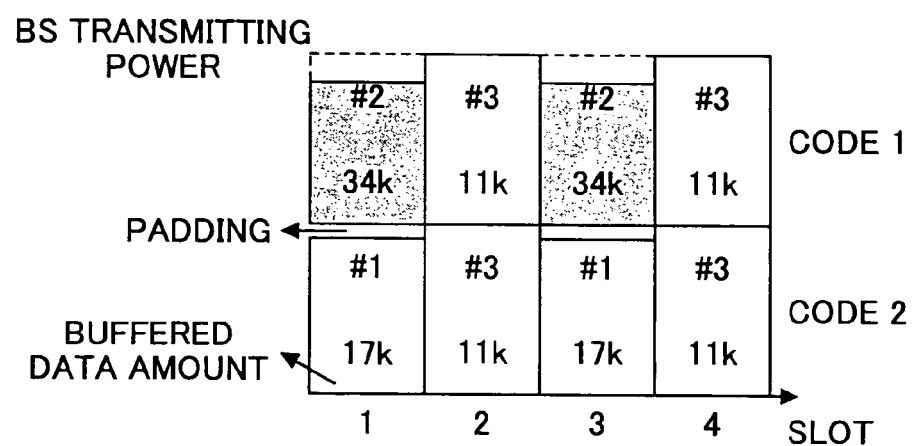

With this arrangement, padding at mobile station #1 becomes only 2 kbits, which equals 17 kbits minus 15 kbits (17−15=2). At mobile station #2, only 9 kbits of padding is required, which equals 34 kbits minus 25 kbits (34−25=9). In this manner, the amount of padding can be reduced greatly, as compared with the conventional technique. Consequently, the transmitting power of the sender (e.g., the base station) wasted for the padding contained in the packets transmitted to the mobile stations #1 and #2, can be reduced, as illustrated in FIG. 8B.

As has been described above, either the base station or the mobile station, which is a sender of a packet, determines a modulation and coding set that satisfies a prescribed transmission condition corresponding to the channel quality; and makes padding, which is added to the data buffered in the transmission buffer when the buffered data amount is less than the transmission block size, become the minimum, based on the channel quality in the packet transmission direction and the amount of buffered data. With this arrangement, if the channel quality is good, and if the amount of buffered data in the transmission buffer is small, a low-rate modulation and coding set is employed. Consequently, the amount of padding added to the data to be transmitted can be reduced, and at the same time, QoS and the protection against interference can be improved.

This patent application is based on and claims the benefit of the earlier filing date of Japanese Patent Application No. 2002-365563 filed Dec. 17, 2002, the entire contents of which are hereby incorporated by reference.

What is claimed is:

1. A packet communications method for carrying out packet communications between a base station and a mobile station located in an area controlled by the base station, the method comprising:
   establishing a list of available modulation schemes, each modulation scheme being associated with a channel quality and an available transmission block size;
   detecting a channel quality between the base station and the mobile station;
   detecting the amount of data buffered in a transmission buffer of a sender;
   determining a temporary modulation scheme and a temporary transmission block size from the list based on the channel quality; and
   if the buffered data amount is greater than or equal to the temporary transmission block size, selecting the temporary modulation scheme as the actual modulation scheme to be used in the packet communications, and if the buffered data amount is less than the temporary transmission block size, selecting a modulation scheme from the list corresponding to a smallest available transmission block size that is greater than or equal to the amount of data buffered and with a minimum difference from the buffered data amount.

2. The packet communications method according to claim 1, wherein the prescribed communication condition is satisfied when a signal to interference noise ratio corresponding to the channel quality in the packet transmission direction exceeds a minimum signal to interference noise ratio for the modulation scheme.

3. The packet communications method according to claim 1, wherein the modulation scheme is determined such that a prescribed communication condition is satisfied, and that padding, which is added to the data buffered in the transmission buffer of the sender when the buffered data amount is less than a transmission unit size, becomes the minimum, based on the channel quality and the buffered data amount.

4. A base station that carries out packet communications with a mobile station located in an area controlled by the base station, the base station comprising:
   a modulation scheme listing unit configured to establish a list of available modulation schemes, each modulation scheme being associated with a channel quality and an available transmission block size;
   a channel quality detecting unit configured to detect a channel quality between the base station and the mobile station;
   a buffered data monitoring unit configured to monitor the amount of data buffered in a transmission buffer of the base station;
   a modulation scheme determination unit configured to determine a temporary modulation scheme and a temporary transmission block size from the list based on the channel quality, said modulation scheme determination unit configured to select the temporary modulation scheme as the actual modulation scheme to be used in the packet communication if the buffered data amount is greater than or equal to the temporary transmission block size, and the modulation scheme determination unit configured to select a modulation scheme from the list corresponding to a smallest available transmission block size that is greater than or equal to the amount of data buffered and with a minimum difference from the buffered data amount if the buffered data amount is less than the temporary transmission block size.

5. The base station according to claim 4, wherein the modulation scheme determination unit determines the modulation scheme that satisfies a prescribed communication condition, and that makes padding, which is added to the data buffered in the transmission buffer when the buffered data amount is less than a transmission unit size, become the minimum, based on the channel quality and the buffered data amount.

6. A mobile station that carries out packet communications with a base station, comprising:
   a modulation scheme listing unit configured to establish a list of available modulation schemes, each modulation scheme being associated with a channel quality and an available transmission block size;
   a channel quality detecting unit configured to detect a channel quality between the base station and the mobile station;
   a buffered data monitoring unit configured to monitor the amount of data buffered in a transmission buffer of the mobile station;
   a modulation scheme determination unit configured to determine a temporary modulation scheme and a temporary transition block size from the list based on the channel quality, said modulation scheme determination unit configured to select the temporary modulation scheme as the actual modulation scheme to be used in the packet communication if the buffered data amount is greater than or equal to the temporary transmission block size, and the modulation scheme determination unit configured to select a modulation scheme from the list corresponding to a smallest available transmission block size that is greater than or equal to the amount of data buffered and with a minimum difference from the buffered data amount if the buffered data amount is less than the temporary transmission block size.

7. The mobile station according to claim 6, wherein the modulation scheme determination unit determines the modulation scheme that satisfies a prescribed communication condition, and that makes padding, which is added to the data buffered in the transmission buffer when the buffered data amount is less than a transmission unit size, become the minimum, based on the channel quality and the buffered data amount.

* * * * *